(12) United States Patent
Yang et al.

(10) Patent No.: US 12,530,932 B2
(45) Date of Patent: Jan. 20, 2026

(54) METHODS AND APPARATUS FOR THE PERFORMANCE OF AUTONOMOUS VEHICLE DIAGNOSTICS TESTING

(71) Applicant: Nuro, Inc., Mountain View, CA (US)

(72) Inventors: Fan Yang, Sunnyvale, CA (US); Marcus Yeo, San Francisco, CA (US); Mason Tian, Mountain View, CA (US); Tamer Kalla, Mountain View, CA (US); Ryan Tyler Mackintosh, Los Gatos, CA (US); Alex Moraru, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 273 days.

(21) Appl. No.: 18/200,935

(22) Filed: May 23, 2023

(65) Prior Publication Data
US 2023/0410569 A1    Dec. 21, 2023

Related U.S. Application Data

(60) Provisional application No. 63/344,982, filed on May 23, 2022.

(51) Int. Cl.
| | |
|---|---|
| *G07C 5/08* | (2006.01) |
| *B60S 1/56* | (2006.01) |
| *B60W 50/02* | (2012.01) |
| *G01M 17/00* | (2006.01) |
| *G01M 17/007* | (2006.01) |
| *G07C 5/00* | (2006.01) |

(52) U.S. Cl.
CPC ........ *G07C 5/0808* (2013.01); *G01M 17/007* (2013.01); *G07C 5/008* (2013.01); *B60S 1/56* (2013.01); *B60W 50/0205* (2013.01)

(58) Field of Classification Search
None
See application file for complete search history.

(56) References Cited

U.S. PATENT DOCUMENTS

| | | | |
|---|---|---|---|
| 10,249,109 B1 | 4/2019 | Konrardy | |
| 10,338,594 B2 | 7/2019 | Long | |
| 10,459,444 B1 * | 10/2019 | Kentley-Klay | ........ G07C 5/008 |
| 10,579,070 B1 | 3/2020 | Konrardy | |
| 10,916,072 B2 * | 2/2021 | Bachant | ................ G07C 5/006 |
| 2004/0167689 A1 * | 8/2004 | Bromley | ................ G07C 5/008 |
| | | | 701/29.6 |
| 2005/0038581 A1 * | 2/2005 | Kapolka | ................ G07C 5/008 |
| | | | 701/31.4 |

(Continued)

*Primary Examiner* — Abdhesh K Jha
(74) *Attorney, Agent, or Firm* — Edell, Shapiro & Finnan, LLC

(57) ABSTRACT

According to one aspect, a method includes obtaining an input and identifying at least a first vehicle which is to be commanded to perform at least one diagnostics test. The method also includes providing a remote diagnostics command to the first vehicle, the remote diagnostics command configured to command the first vehicle to perform at least a first diagnostics test, wherein the first diagnostics test is performed by the first vehicle on at least a first system included on the first vehicle. The first vehicle is monitored during the first diagnostics test. Diagnostics data associated with the first diagnostics test is obtained from the first vehicle and processed to generate diagnostics for the first vehicle.

18 Claims, 15 Drawing Sheets

(56) References Cited

U.S. PATENT DOCUMENTS

| | | | | |
|---|---|---|---|---|
| 2006/0229777 A1* | 10/2006 | Hudson | ............... | G05B 23/021 |
| | | | | 701/31.4 |
| 2021/0331686 A1 | 10/2021 | Beyers | | |
| 2021/0375076 A1* | 12/2021 | Scotland | .............. | G07C 5/0825 |
| 2022/0350335 A1* | 11/2022 | Reschka | ............. | G05D 1/0088 |

* cited by examiner

US 12,530,932 B2

METHODS AND APPARATUS FOR THE PERFORMANCE OF AUTONOMOUS VEHICLE DIAGNOSTICS TESTING

PRIORITY CLAIM

This patent application claims the benefit of priority under 35 U.S.C. § 119 to U.S. Provisional Patent Application No. 63/344,982, filed May 23, 2022, and entitled "METHOD AND APPARATUS FOR PERFORMING AUTONOMOUS VEHICLE DIAGNOSTICS AND TESTING," which is incorporated herein by reference in its entirety.

TECHNICAL FIELD

The disclosure relates to autonomous vehicles. More particularly, the disclosure relates to the performance of diagnostic testing on autonomous vehicles.

BACKGROUND

As the use of autonomous vehicles such as occupantless or zero-occupant vehicles increases, the need to perform diagnostic testing of such vehicles efficiently is also increasing. Fleets of autonomous vehicles present challenges with respect to vehicle maintenance, testing, and management. Traditional techniques used for diagnostic vehicle testing may be insufficient for autonomous vehicles due to the increased complexity of systems and sensors used to support autonomous capabilities.

Testing of zero-occupant, or occupantless, autonomous vehicles is challenging because technicians and engineers may not be able to interact with such vehicles in the same manner as traditional vehicles. For example, there is typically no ability for an individual to enter a zero-occupant vehicle to interact with internal vehicle controls in the course of testing the vehicle.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
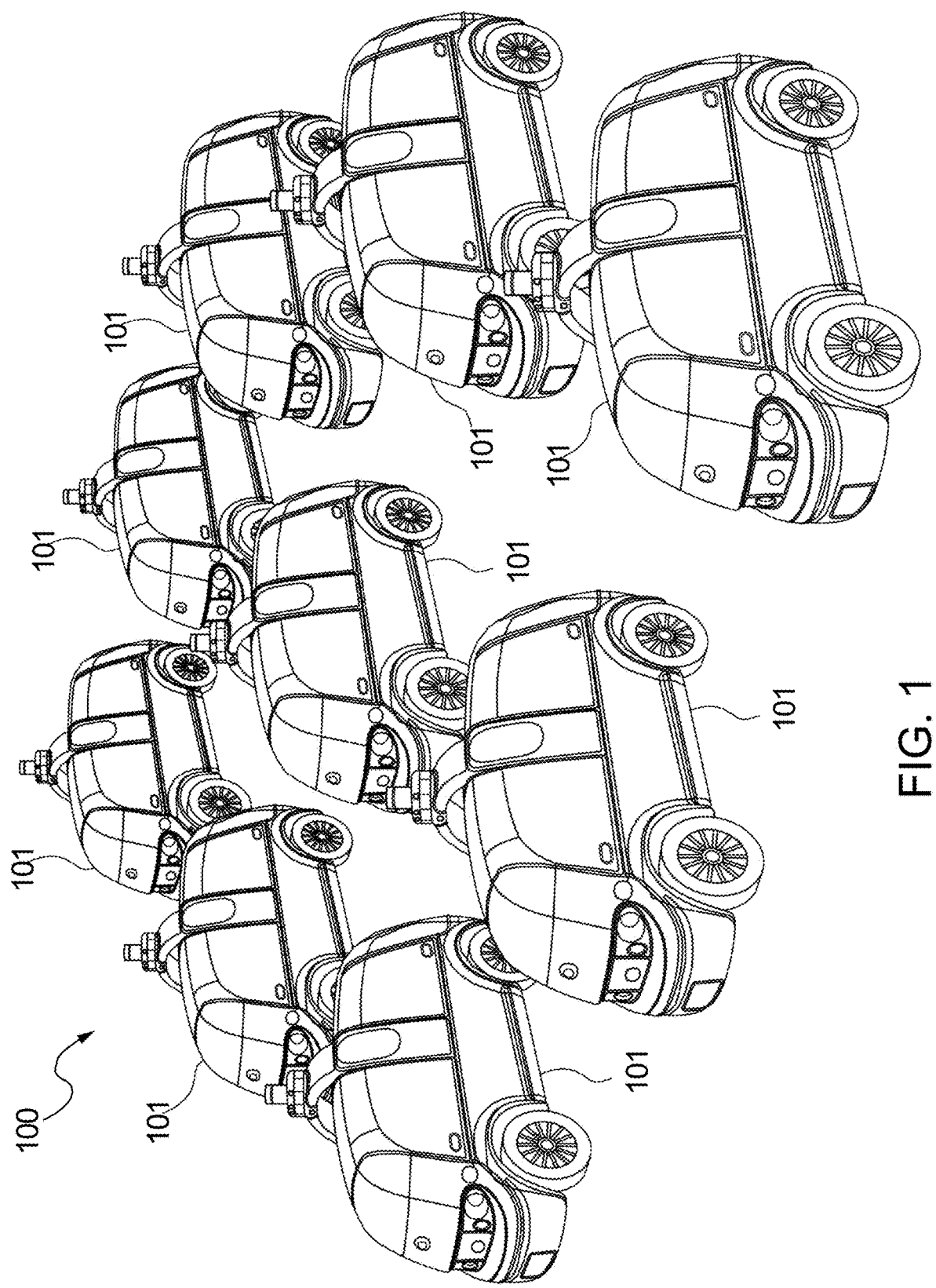
FIG. 1 is a diagrammatic representation of an autonomous vehicle fleet in accordance with an embodiment.

In one embodiment, a method includes obtaining an input and identifying at least a first vehicle which is to be commanded to perform at least one diagnostics test. The method also includes providing a remote diagnostics command to the first vehicle, the remote diagnostics command configured to command the first vehicle to perform at least a first diagnostics test, wherein the first diagnostics test is performed by the first vehicle on at least a first system included on the first vehicle. The first vehicle is monitored during the first diagnostics test. Diagnostics data associated with the first diagnostics test is obtained from the first vehicle and processed to generate diagnostics for the first vehicle.

According to another embodiment, logic embodied in a computer-readable medium is operable, when executed, to obtain an input and to identify at least a first vehicle which is to be commanded to perform at least one diagnostics test. The logic is also operable to provide a remote diagnostics command to the first vehicle, the remote diagnostics command configured to command the first vehicle to perform at least a first diagnostics test, wherein the first diagnostics test is performed by the first vehicle on at least a first system included on the first vehicle. The logic also includes logic operable to monitor the first vehicle during the first diagnostics test and to obtain diagnostics data associated with the first diagnostics test from the first vehicle and process the diagnostics data to generate diagnostics for the first vehicle.

In accordance with still another embodiment, a system includes an autonomous vehicle management system (AVMS); and a first fleet, the first fleet including at least a first vehicle. The first vehicle includes a first arrangement, the first arrangement configured to perform at least a first diagnostics test on the first vehicle, wherein the AVMS includes logic operable to manage the first fleet. The logic operable to manage the first fleet is operable to generate a first remote diagnostics command, the first remote diagnostics command arranged to cause the first vehicle to perform the first diagnostics test.

An autonomous vehicle management system (AVMS) which manages a fleet of autonomous vehicle may be used to facilitate diagnostics testing of each vehicle to ascertain whether the vehicle is able to operate as expected. A user such as a maintenance technician may use the AVMS to identify vehicles to test and, additionally, the self-diagnostics tests to be performed by the vehicles. Data collected from a vehicle during the self-diagnostics tests may be processed or analyzed to determine whether the vehicle is capable of operating at a desired performance level.

Description

Autonomous vehicles are often organized in fleets that are managed by or otherwise associated. These fleets of autonomous vehicles need to be managed, serviced, and maintained such that they remain in ideal operating conditions. Diagnostics and testing, or diagnostics testing, may be performed periodically on each of the autonomous vehicles of an autonomous vehicle fleet to ensure that the vehicles are operational and able to operate at a desired or expected level. For example, a set of diagnostics and tests may be performed daily on each autonomous vehicle included in a fleet prior to the vehicles being deployed on missions.

By providing a management system, as for example an autonomous vehicle management system (AVMS), the operation and testing of autonomous vehicles such as occupantless autonomous vehicles may be coordinated. Specifically, the AVMS may be arranged to manage various aspects of the operations of one or more fleets of autonomous vehicles. The various aspects may include, but are not limited to including, substantially ensuring that each vehicle in a fleet may meet operational requirements, and causing one or more tests to be triggered on one or more vehicles. In one embodiment, the AVMS may determine which diagnostics and tests are to be performed on a particular autonomous vehicle by transmitting one or more commands to cause the particular vehicle to perform the diagnostics and tests identified by the AVMS. In such an embodiment, the AVMS may further be arranged to obtain diagnostics data provided by the autonomous vehicle and to process, e.g., analyze, the diagnostics data to determine whether the autonomous vehicle is suitable for a mission the autonomous vehicle is expected to fulfill. Missions may include, but are not limited to including, delivery requests, pick up requests, transportation requests, and/or other service requests.

Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. That is, autonomous vehicles 101 may be deployed on missions that involve picking up and/or delivering items. In some embodiments, autonomous vehicle fleet 100 may include vehicles which may transport occupants and, hence, may be deployed on missions that involve driving passengers. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
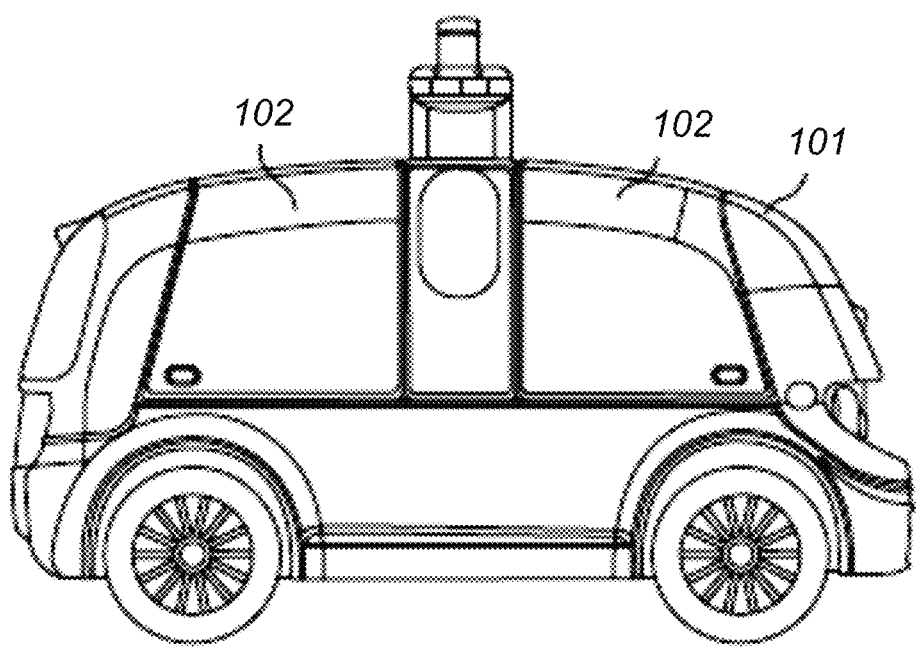
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
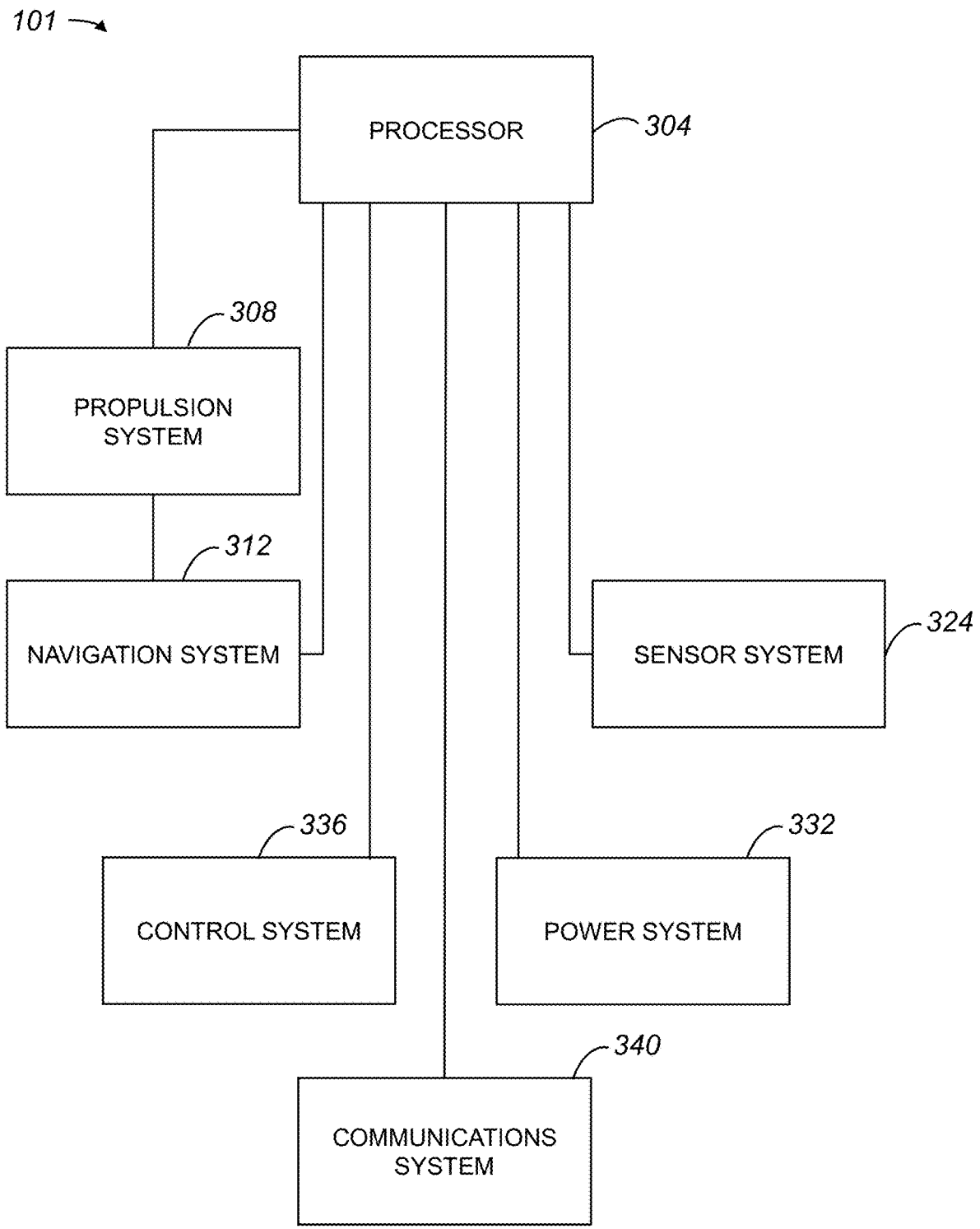
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Figure 4A:
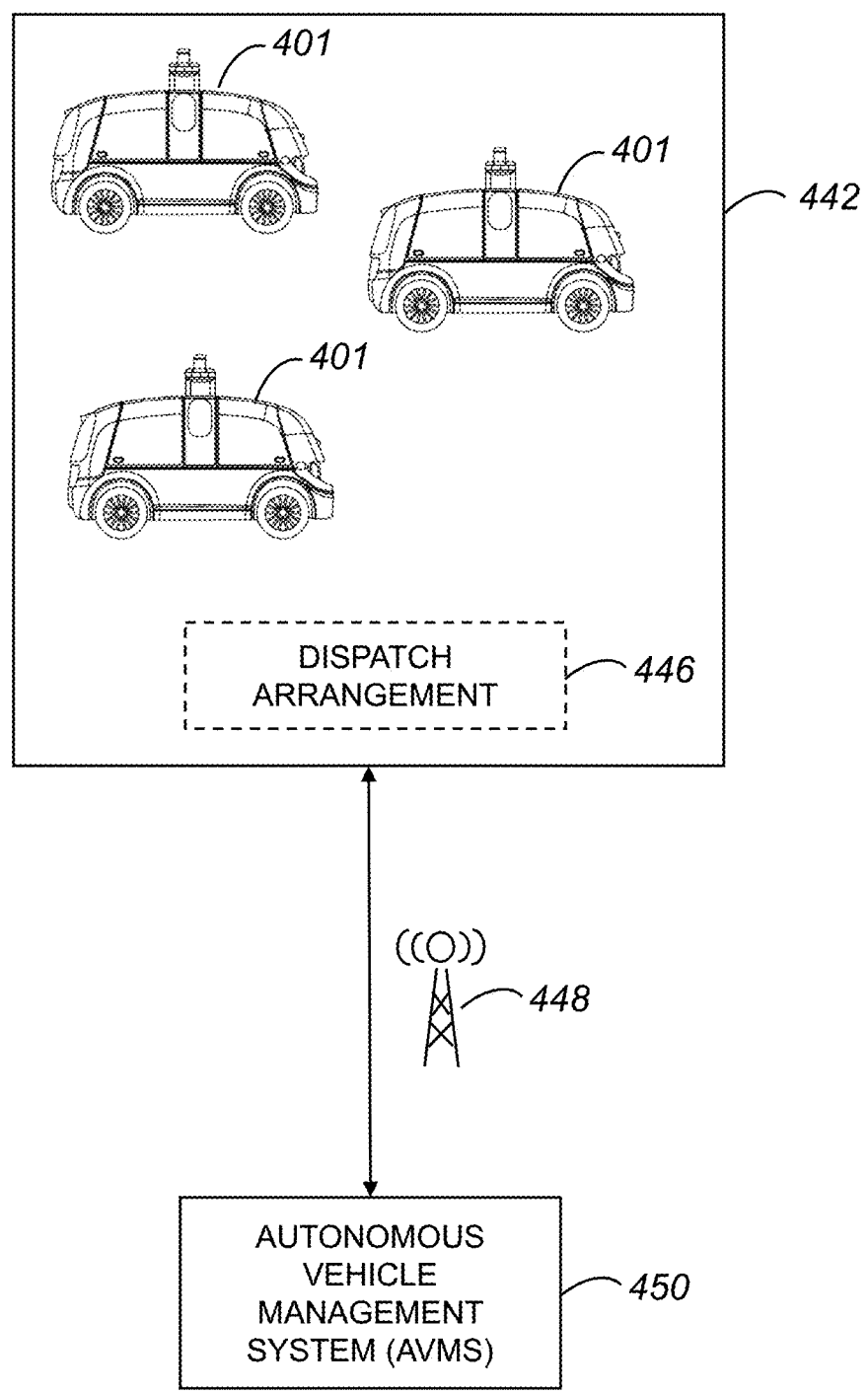
FIG. 4A is a diagrammatic representation of an overall framework in which an autonomous vehicle management system (AVMS) manages a fleet of vehicles in accordance with an embodiment.

Referring next to FIG. 4A, a framework which includes AVMS will be discussed. FIG. 4A is a diagrammatic representation of an overall framework in which an AVMS manages a fleet of vehicles in accordance with an embodiment. An AVMS 450 communicates with a fleet 442 of vehicles 401. Communications between AVMS 450 and fleet 442 may be facilitated by a dispatch arrangement 446. Dispatch arrangement 446 may obtain and process requests for missions, e.g., deliveries, to be performed by vehicles 401 in fleet 442. Dispatch arrangement 446 may identify particular vehicles 401 to effectively fulfill a request. In one embodiment, a vehicle 401 selected to complete a mission may be subjected to diagnostics testing to ensure that the selected vehicle 401 is capable of operating as expected. It should be appreciated that dispatch arrangement 446 may be optional, and that in some instances, AVMS 450 may obtain requests and assign vehicles 401 to effectively fulfill requests.

Figure 4B:
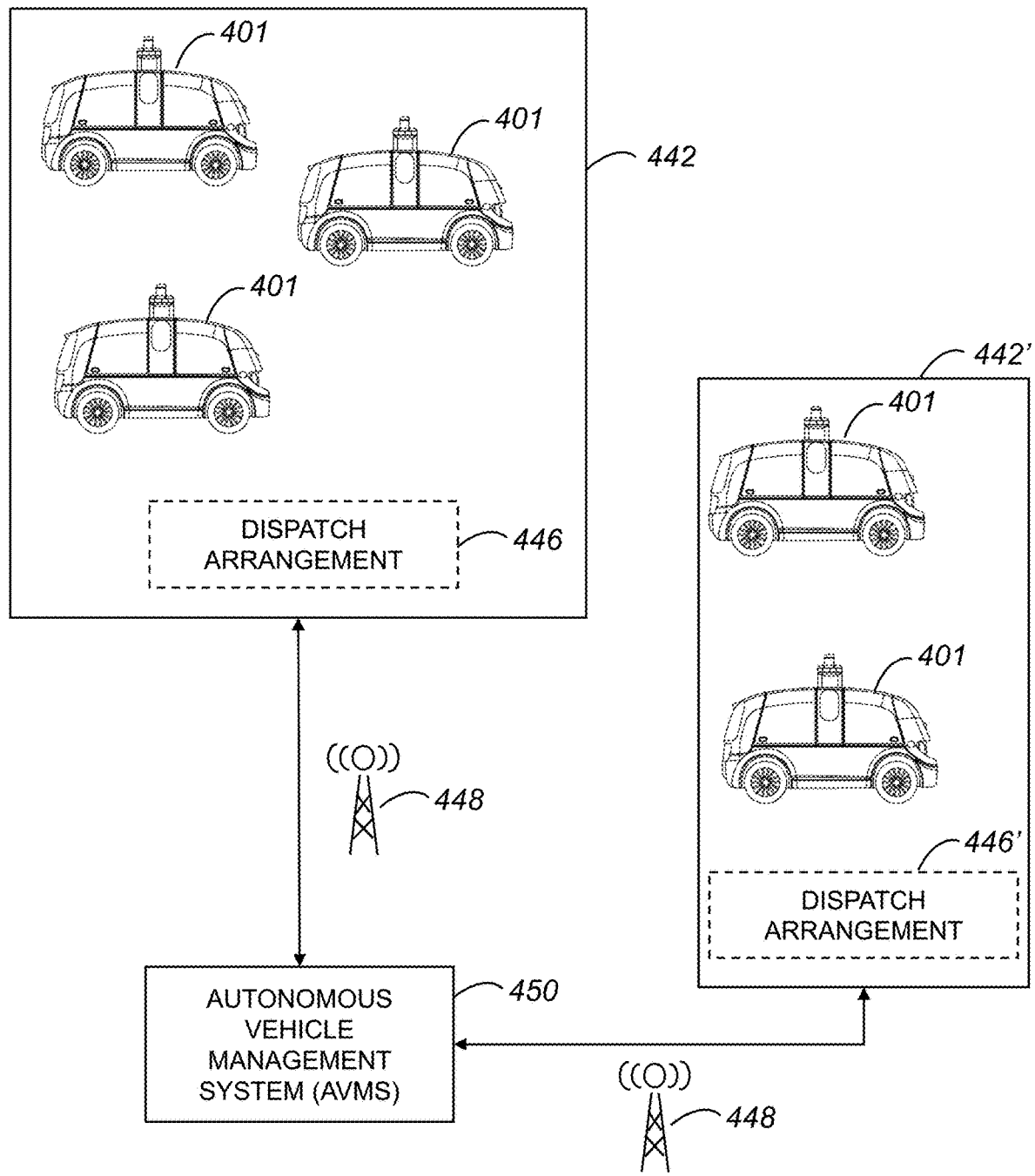
FIG. 4B is a diagrammatic representation of an overall framework in which an AVMS, e.g., AVMS 450 of FIG. 4A, manages two or more fleets of vehicles in accordance with an embodiment.

In one embodiment, AVMS 450 may effectively manage more than one fleet of vehicles. Different fleets of vehicles may be owned by different enterprises, or fleets of vehicles may be associated with different types of vehicles or different types of missions to be provided by the fleets. In addition, fleets may be grouped based on geographical locations of vehicles and/or particular maintenance or manufacturing facilities responsible for the vehicles. FIG. 4B is a diagrammatic representation of an overall framework in which AVMS 450 manages two or more fleets of vehicles in accordance with an embodiment. AVMS 450, as discussed above, manages fleet 442. In addition to managing fleet 442, AVMS 450 may also manage another fleet 442' which includes vehicles 401. Fleets 442, 442' may be managed and/or maintained substantially independently by uses associated with each fleet 442, 442' using AVMS 450. It should be appreciated that AVMS 450 may provide a cloud-based autonomous vehicle management service to multiple fleets including fleets 442, 442'.

In one embodiment, dispatch arrangement 446 may differ from dispatch arrangement 446'. By way of example, dispatch arrangement 446 may be a dispatch system associated with an enterprise which dispatches vehicles 401 within fleet 442, while dispatch arrangement 446' may include devices such as cell phones which may be used by users to dispatch vehicles 401 within fleet 442'. It should be appreciated, however, that dispatch arrangements 446, 446' may each include a dispatch system and/or other devices.

Figure 5:
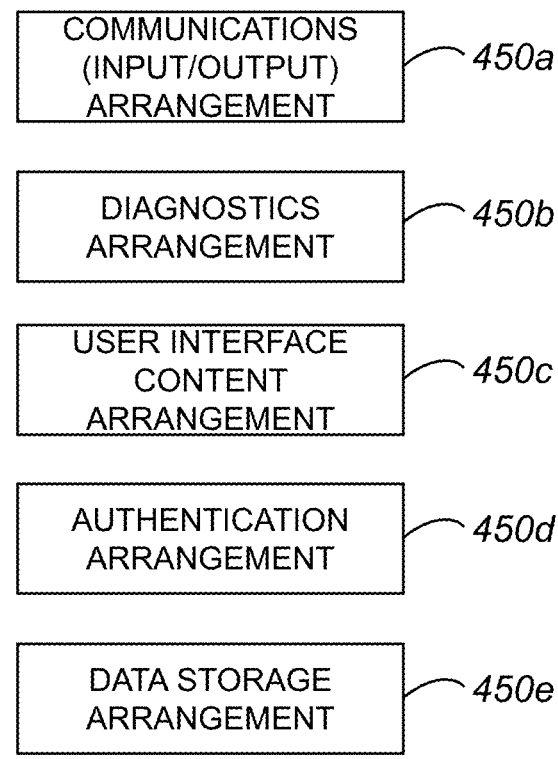
FIG. 5 is a block diagram representation of an AVMS, e.g., AVMS 450 of FIGS. 4A and 4B, in accordance with an embodiment.

With reference to FIG. 5, AVMS 450 will be described in accordance with an embodiment. AVMS 450, which may include hardware and/or software logic embodied on a computer-readable medium, includes a communications or input/output arrangement 450a, a diagnostics arrangement 450b, a user interface content arrangement 450c, an authentication arrangement 450d, and a data storage arrangement 450a.

Communications arrangement 450a enables AVMS 450 to communicate with a vehicle fleet over a network. A network may be a data network such as a cellular data network or the Internet. Communications arrangement 450a may communicate directly with vehicles, with a dispatch arrangement associated with a fleet, and/or with devices in the possession of users on which AVMS user interfaces are presented to enable users to interact with AVMS 450 to facilitate diagnostics testing.

Diagnostics arrangement 450b may be configured to provide, e.g., transmit, commands to autonomous vehicles to essentially initiate diagnostics testing on the vehicles, as well as to process data received from vehicles after diagnostics testing is substantially completed. In one embodiment, diagnostics arrangement 450b may generate and provide remote diagnostics commands to vehicles based upon selections made by a user. For example, when a user uses a device with an AVMS user interface to interact with AVMS 450, diagnostics arrangement 450b may respond by providing remote diagnostics commands to one or more vehicles to initiate self-diagnostics tests. It should be appreciated that diagnostics arrangement 450b may further be arranged to determine a sequence in which self-diagnostics tests are to be performed.

User interface content arrangement 450c is configured to generate and to provide user interface content, as for example graphical user interface content, to a device that may be used by a user to interact with AVMS 450. Such generated content may be provided to a user device using communications arrangement 450a. Upon obtaining or otherwise receiving input from a user, e.g., through a user interface, user interface content arrangement 450c may identify vehicles to test and diagnostics tests which are to be performed. In one embodiment, user interface content arrangement 450c obtains information from a user which may be used to authenticate the user.

Authentication arrangement 450d is configured to authenticate a user and/or a user device to effectively identify vehicles in a fleet that the user has appropriate access rights to cause to perform diagnostics testing. Authentication arrangement 450d may access stored information, e.g., information stored in data storage arrangement 450a, to authenticate a user. The stored information may include user profiles or credentials, and may indicate a level of access the user is substantially afforded. The level of access assigned to a user may determine which vehicles the user may view using AVMS 450, as well as which diagnostics tests the user has the capacity to substantially authorize. It should be appreciated that authentication arrangement 450d may use any suitable information to authenticate a user. Such information may include, but is not limited to including, a location associated with the user and/or information relating to a network being used by the user to interact with AVMS 450.

Data storage arrangement 450a may be a database in which information relating to one or more fleets, one or more vehicles, and/or one or more diagnostics tests may be stored. In addition, data storage arrangement 450a may store user profiles or credentials, as previously mentioned. Results of diagnostics tests may also be stored in data storage arrangement 450a.

Figure 6:
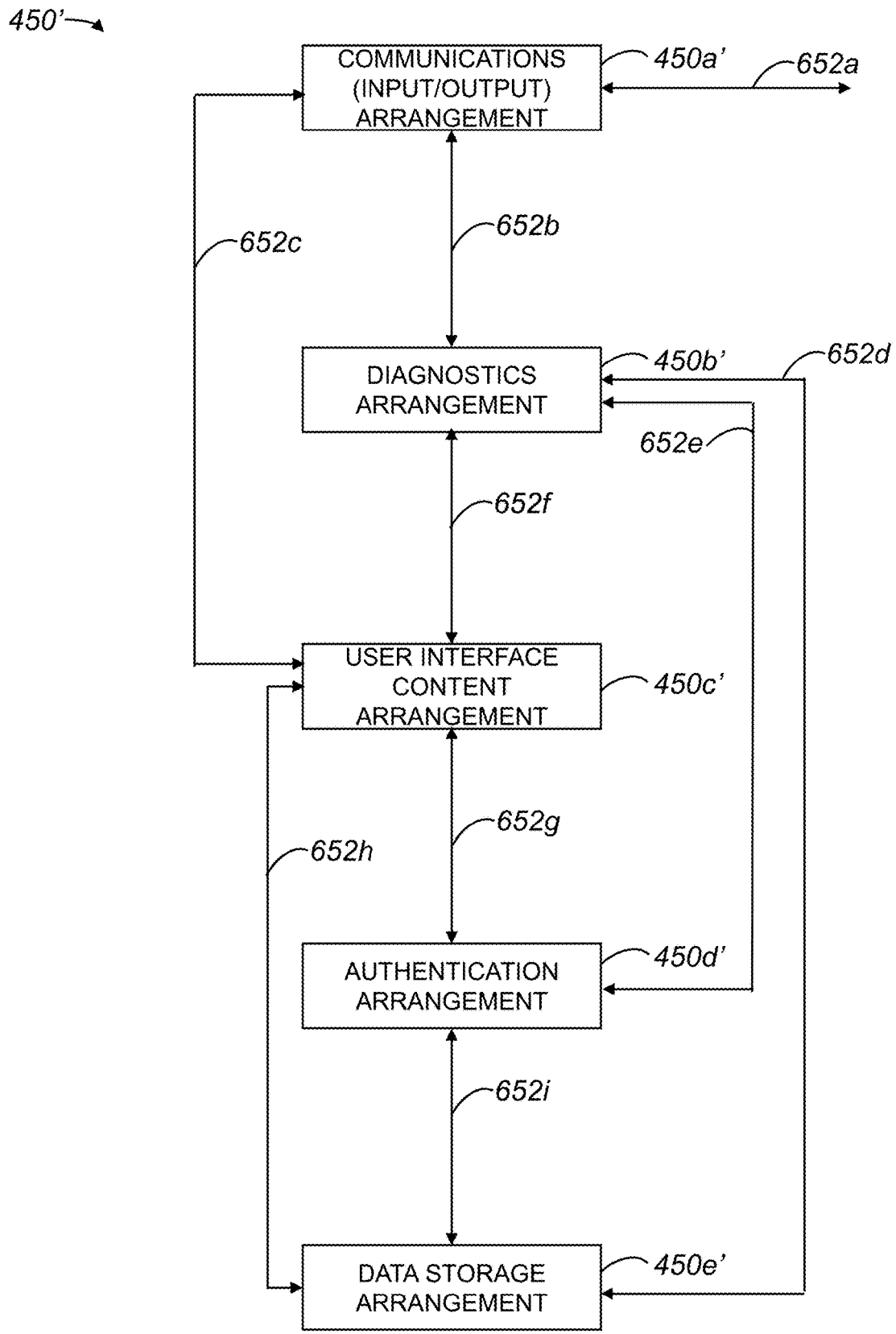
FIG. 6 is a block diagram representation of a flow of information associated with an AVMS, e.g., AVMS 450 of FIG. 5, in accordance with an embodiment.

FIG. 6 is a block diagram representation of a flow of information associated with AVMS 450 in accordance with an embodiment. AVMS 450' is configured such that communications arrangement 450a' provides information such as a user interface on a network connection 652a and obtains information such as user input on network connection 652a. Communications arrangement 450a' also provides data on a connection 652b to diagnostics arrangement 450b', and obtains data on connection 652b from diagnostics arrangement 450b'. Communications arrangement 450a' may still further exchange data with user interface content arrangement 450c' over a connection 652c.

Diagnostics arrangement 450b' exchanges data with data storage arrangement 450e' over a connection 652d, exchanges data with authentication arrangement 450d' over a connection 652e, and exchanges data with user interface content arrangement 450c' over a connection 652f. User interface content arrangement 450c' exchanges data with authentication arrangement 450de' over a connection 652g, and with data storage arrangement 450e' over a connection 652h. Authentication arrangement 450d' exchanges data with data storage arrangement 450e' over a connection 652i.

Figure 7:
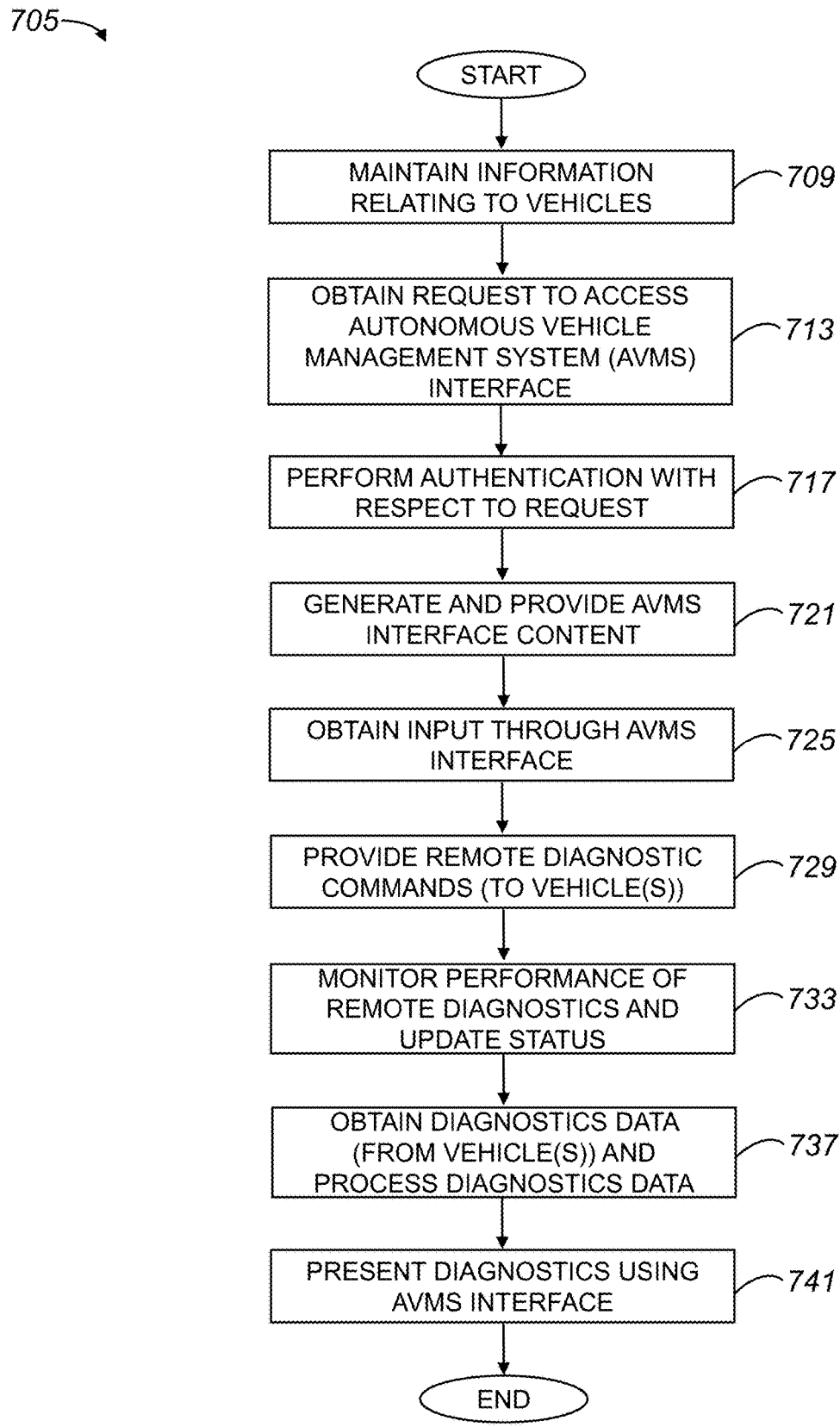
FIG. 7 is a process flow diagram which illustrates a method of performing diagnostics testing with respect to a vehicle using an AVMS from the point-of view of the AVMS in accordance with an embodiment.

FIG. 7 is a process flow diagram which illustrates a method of performing diagnostics testing with respect to a vehicle using an AVMS from the point-of view of the AVMS in accordance with an embodiment. A method 705 of performing diagnostics testing with respect to a vehicle using an AVMS begins at a step 709 in which an AVMS maintain information relating to vehicles in one or more fleets of vehicles, e.g., fleets of autonomous vehicles. The information maintained by the AVMS may include, but is not limited to including, information that facilitates the performance of self-diagnostic tests by a vehicle such as software configurations of vehicles, hardware configurations of vehicles, status of vehicles, locations of vehicles, maintenance and diagnostics records of vehicles, and/or vehicle route and service information. Such information may be updated periodically, and/or may be updated substantially in real-time based on information received from vehicles, as for example after the vehicles complete self-diagnostic testing.

In a step 713, the AVMS obtains a request to access an AVMS interface. The request may originate from a user through a device that communicates with the AVMS over a network. The user may access a user interface provided on the device.

After obtaining the request to access the AVMS interface, the AVMS performs authentication with respect to the request in a step 717. That is, the AVMS effectively authenticates the user. Authenticating the user may include comparing information obtained from the user with information stored in the AVMS to substantially ascertain whether the user is authorized or otherwise has permission to use the AVMS to initiate diagnostics testing in one or more vehicles.

Once the user is authenticated, the AVMS generates and provides content for an AVMS interface that is accessible to the user in a step 721. In other words, the AVMS generates content that may be rendered or otherwise presented to the user on a device in possession of the user. The content may generally include information relating to vehicles that the user is authorized to have access to and diagnostics tests that the user is authorized to initiate. That is, the content may include information relating to vehicles and diagnostics tests that the user has sufficient access rights to obtain. The content may be customized for the user, e.g., may include information presented in a format preferred by the user and/or may include specific information that the user generally requests to be presented with. It should be appreciated that different users may prefer different content and/or different forwards for the content. Typically, the content is presented such that the user may interact with the content.

In a step 725, the AVMS obtains input from the user through the AVMS interface. The input includes, but is not limited to including, information relating to the vehicles that are to perform diagnostics tests on themselves and the diagnostics tests that are to be performed.

From step 725, process flow proceeds to a step 729 in which the AVMS processes the obtained input to identify and to provide remote diagnostic commands to one or more vehicles included in the vehicle fleet. The input may generally correspond to one or more commands to perform a set or suite of diagnostics tests for one or more vehicles.

Once remote diagnostics commands are provided or otherwise sent to one or more vehicles, the one or more vehicles may perform the diagnostics tests, and the AVMS monitors the performance of the diagnostics tests in a step 733. Updating the status may generally include, but are not limited to including, determining how the diagnostics tests are progressing and/or updating the content provided to the user on the AVMS interface to indicate how the diagnostics tests are progressing.

In a step 737, the AVMS obtains diagnostics data from the one or more vehicles, and processes the diagnostics data. In one embodiment, the diagnostics data is obtained when the diagnostics tests are completed. In another embodiment, as the one or more vehicles perform diagnostics tests, the vehicles may transmit data to the AVMS which may then update the statuses of the one or more vehicles and, when the tests are completed, the AVMS may process the diagnostics data.

After the diagnostics data is processed, the processed diagnostics data is provided to the AVMS interface in a step 741. The processed data is rendered for display or otherwise presented to the user using the AVMS interface. Upon presenting the diagnostics, the method of performing diagnostics testing with respect to a vehicle using an AMS is completed.

Figure 8:
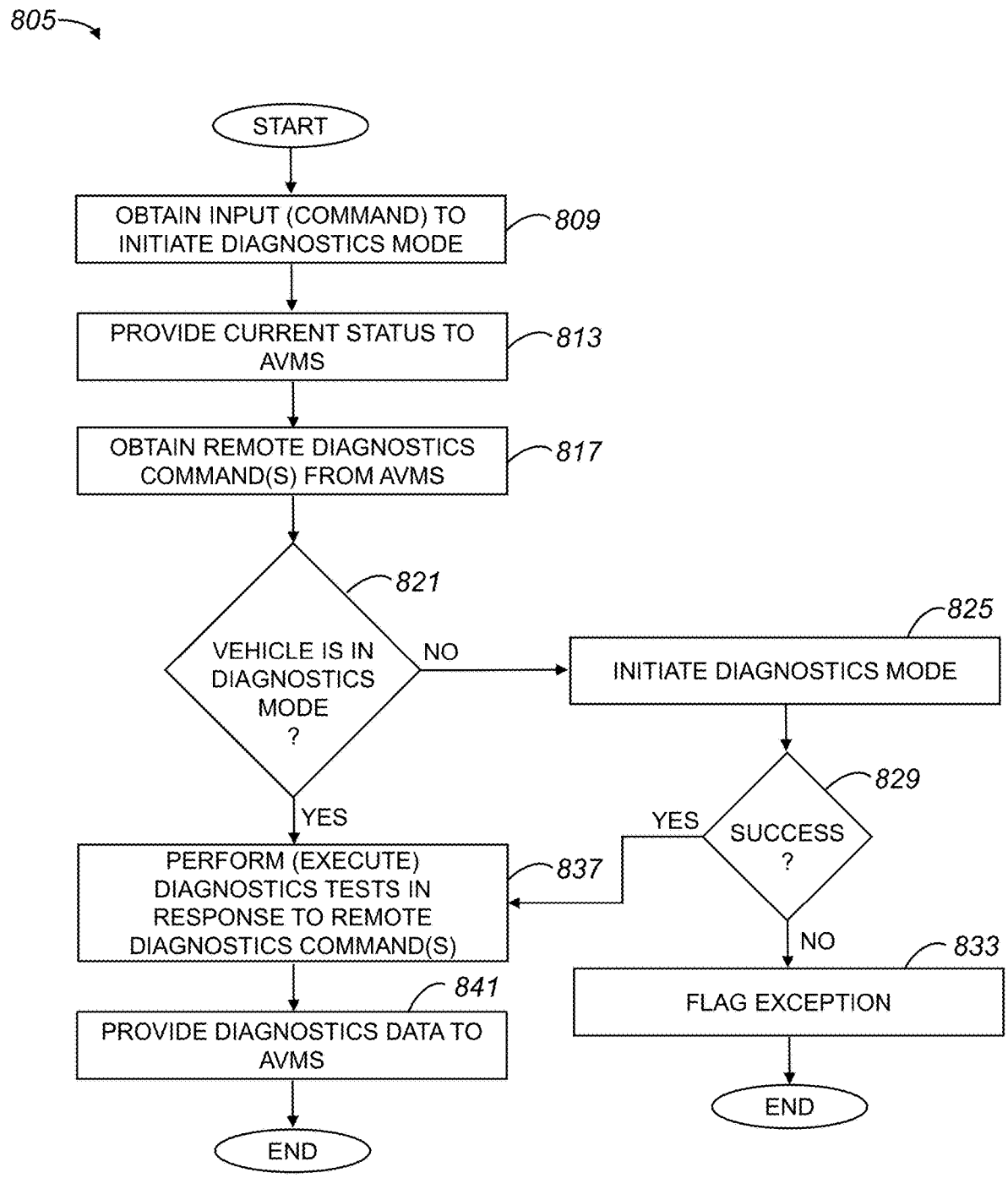
FIG. 8 is a process flow diagram which illustrates a method of performing diagnostics testing with respect to a vehicle using an AVMS from the point-of view of the vehicle in accordance with an embodiment.

Referring next to FIG. 8, a method of performing diagnostics testing with respect to a vehicle using an AVMS from the point-of-view of the vehicle will be described in accordance with an embodiment. A method 805 of performing diagnostics testing with respect to a vehicle using an AVMS begins at a step 809 in which a vehicle obtains an input, e.g., a command, to initiate a diagnostics mode. A diagnostics mode, or a service node, is generally a vehicle state which enables the vehicle to perform diagnostics testing on itself. It should be appreciated that in order to enable the vehicle to operate safely, unless the vehicle is in a diagnostics mode, the vehicle may be substantially prevented from performing diagnostics tests. The input may be obtained from a user, as for example through interactions with a human machine interface (HMI) provided on the vehicle, or through a command effectively sent by the user over a network or other connection.

In a step 813, the vehicle provides a current status to the AVMS. That is, the vehicle may transmit a current status to the AVMS. After providing a current status to the AVMS, the vehicle obtains one or more remote diagnostics commands from the AVMS in a step 817.

Once the vehicle obtains one or more remote diagnostics commands from the AVMS, a determination is made in a step 821 as to whether the vehicle is in a diagnostics mode. That is, it is determined whether the vehicle is in a state in which diagnostics testing may be performed.

If the determination in step 821 is that the vehicle is in a diagnostics mode, the process flow proceeds to a step 837 in which the vehicle performs or executes one or more diagnostics tests in response to one or more remote diagnostics commands. One method of performing diagnostics tests will be discussed in more detail below with respect to FIGS. 9A and 9B. Once the diagnostics tests are performed, data obtained from the diagnostics tests is essentially collected and provided to the AVMS, and the method of performing diagnostics testing with respect to a vehicle using an AVMS is completed.

Alternatively, if it is determined in step 821 that the vehicle is not in a diagnostics mode, then an attempt is made in a step 825 to initiate a diagnostics mode. A determination is then made in a step 829 as to whether diagnostics mode has been successfully initiated. If the determination is that diagnostics mode has been successfully initiated, then process flow proceeds to step 837 in which one or more diagnostics tests is performed.

On the other hand, if the determination in step 829 is that diagnostics mode has not been successfully initiated, the implication is that the vehicle is not in a situation that would enable the vehicle to safely conduct diagnostics tests. As such, an exception is flagged in a step 833, and the method of performing diagnostics testing with respect to a vehicle using an AVMS is terminated. It should be understood that flagging an exception may include, but is not limited to including, providing an indication to the AVMS that the vehicle has not successfully initiated a diagnostics mode.

Figure 9A:
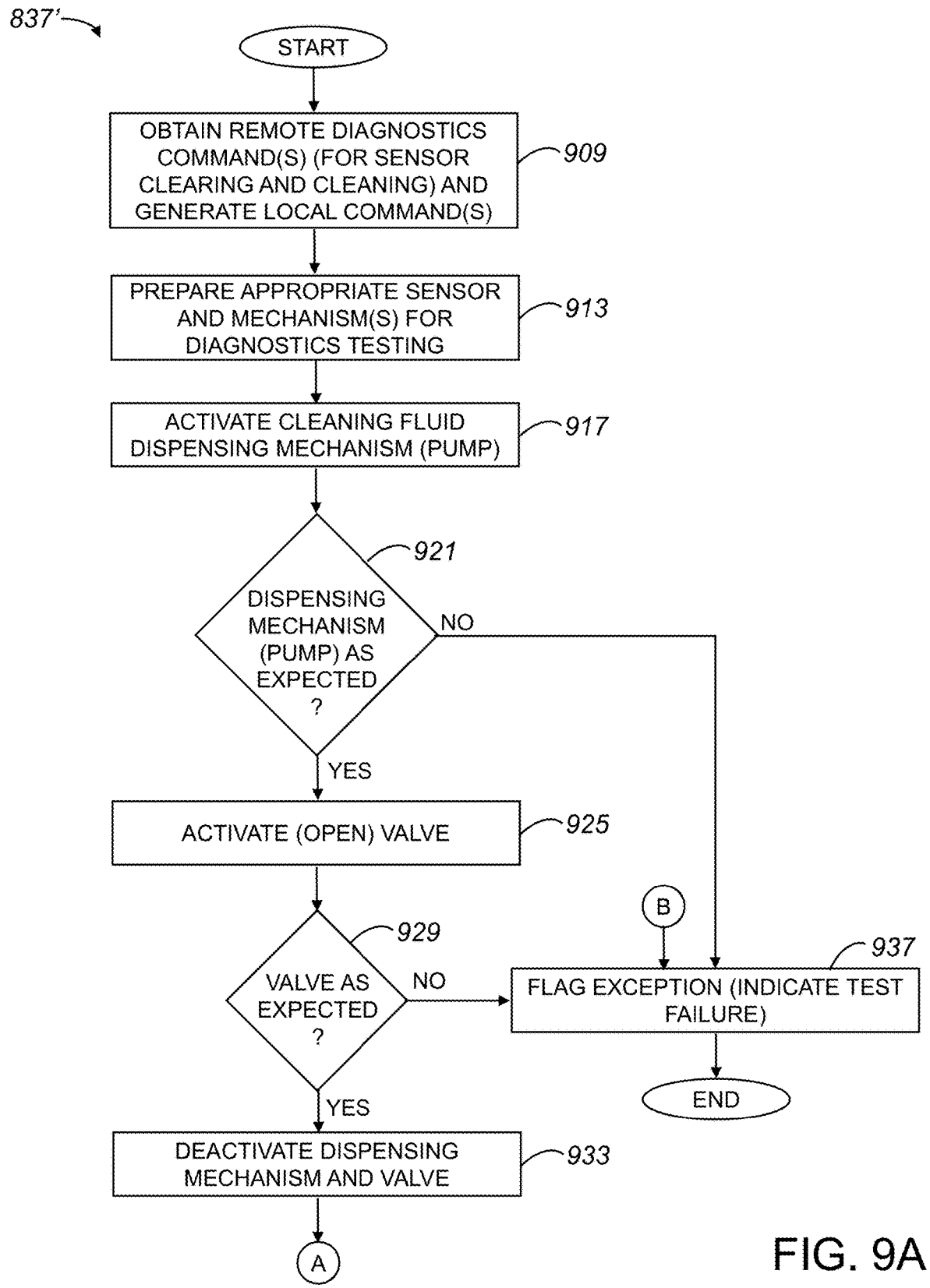
FIGS. 9A and 9B are a process flow diagram which illustrates a method of performing diagnostics tests, e.g., step 837 of FIG. 8, in accordance with an embodiment.
Figure 9B:
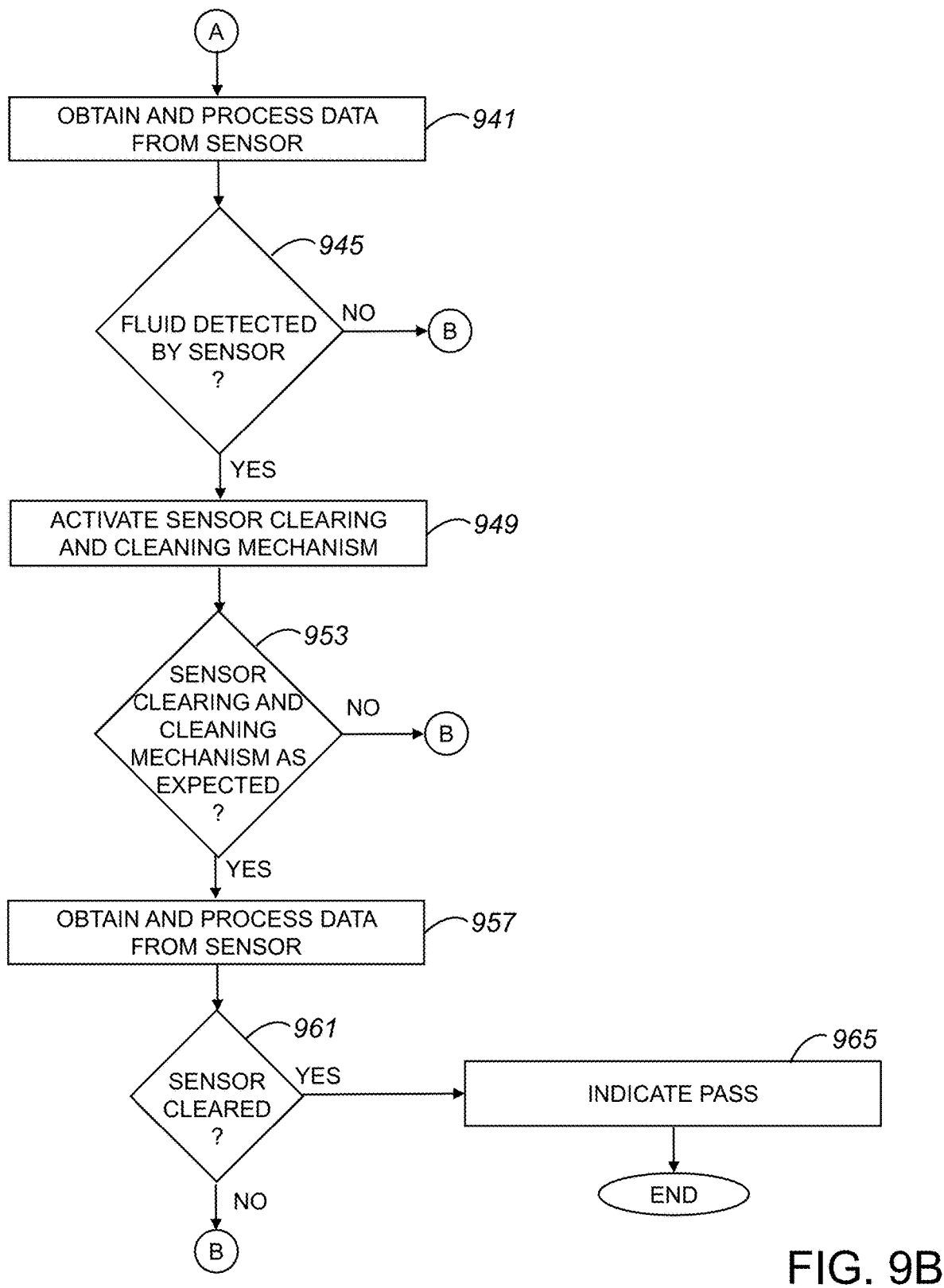

FIGS. 9A and 9B are a process flow diagram which illustrates a method of performing diagnostics tests, e.g., step 837 of FIG. 8, in accordance with an embodiment. Method 837 of preforming one or more diagnostics tests begins at a step 909 in which one or more remote diagnostics commands is obtained from an AVMS, and one or more local commands is generated in response to the one or more remote diagnostics commands. In one embodiment, the one or more remote diagnostics commands are associated with performing diagnostics on a sensor clearing and cleaning system.

In a step 913, an appropriate sensor and associated mechanism may be prepared for diagnostics testing. For example, a particular sensor and the clearing and cleaning mechanism associated with the particular sensor may effectively be readied for diagnostics testing. It should be appreciated that an appropriate sensor may be a sensor assembly that includes more than one sensor, and that the clearing and cleaning mechanism may be arranged to clear and/or to clear more than one sensor. A flow meter may be used to measure air flow exiting from nozzles of cleaning and clearing pipes.

Once the appropriate sensor and corresponding mechanism are prepared for diagnostics testing, a cleaning fluid dispensing mechanism is activated in a step 917. The cleaning fluid dispensing mechanism is part of a sensor clearing and cleaning mechanism, and may include, in one embodiment, a pump.

A determination is made in a step 921 as to whether the dispensing mechanism is operating as expected. That is, it is determined whether the dispensing mechanism is performing to specifications, e.g., by dispensing an expected amount of fluid. If it is determined that the dispensing mechanism is not operating as expected, then process flow moves to a step 937 in which an exception is flagged to effectively indicate a diagnostic test failure. Upon flagging an exception, the method of performing one or more diagnostics tests is terminated.

Alternatively, if it is determined in step 921 that the dispensing mechanism is operating as expected, then a valve that is part of a sensor clearing and cleaning mechanism is activated in a step 925. Once the valve is activated, it is determined in a step 929 whether the valve operates as expected. If it is determined that the valve is not operating as expected, then an exception is flagged in step 937. On the other hand, if it is determined that the valve is operating as expected, then process flow proceeds to a step 933 in which the dispensing mechanism and the valve are deactivated.

After the dispensing mechanism and the valve are deactivated, then data is obtained from the sensor and process in a step 941. The sensor may generally collect data relating to whether the dispensing mechanism and the valve have cooperated to provide fluid to a surface associated with the sensor.

In a step 945, a determination is made as to whether fluid is detected by the sensor. Such a determination may include determining whether the dispensing mechanism have dispensed an expected amount of fluid onto a surface of the sensor. If the determination is that fluid is not detected by the sensor, then process flow moves to step 937 in which an exception is flagged.

Alternatively, if it is determined in step 945 that fluid is detected by the sensor, the sensor clearing and cleaning mechanism is activated in a step 949. Once the sensor clearing and cleaning mechanism is activated, it is determined in a step 953 whether the sensor clearing and cleaning mechanism is operating as expected. If it is determined that the sensor clearing and cleaning mechanism is not operating as expected, then process flow moves to step 937 in which an exception is flagged. On the other hand, if the determination is that the sensor clearing and cleaning mechanism is operating as expected, then in a step 957, data is obtained from the sensor and processed. The data may be processed to determine whether the sensor clearing and cleaning mechanism has successfully cleared a surface of the sensor.

It is determined in a step 961 whether the sensor is cleared. In one embodiment, such a determination may include assessing whether fluid has been cleared from a surface of the sensor, and whether a sensing surface, e.g., a lens, is clean. If the determination is that the sensor is not cleared, then an exception is flagged in step 937. If the determination is that the sensor is cleared, then an indication that the sensor and the sensor clearing and cleaning mechanism have passed one or more diagnostics tests is recorded in a step 965. Once a pass indication is recorded or a pass is otherwise flagged, the method of performing one or more diagnostics tests is completed.

The interface used by a user, e.g., an individual who is expected to perform maintenance on and to troubleshoot issues with vehicles, generally provides information which the individual may use to select vehicles to test and diagnostics tests for the vehicles to run. An AVMS may be configured to provide an interface such as a graphical user interface that may be rendered on a display screen that is accessible to individuals with the authority or ability to perform maintenance on and to troubleshoot issues with vehicles included in a fleet. Such a display screen may be part of a device, e.g., a computing device or a smartphone, utilized by a maintenance technician or specialist who may perform maintenance on or troubleshoot issues relating to vehicles.

A graphical user interface may present information relating to one or more vehicles included in a fleet of vehicles. A particular user, e.g., a particular maintenance technician, who is physically located at a vehicle maintenance depot or garage may be presented with a graphical user interface that displays information relating to a vehicle fleet that is maintained at the vehicle maintenance depot or garage. The user may substantially interact with the graphical user interface to view vehicles in the fleet for which self-diagnostics are available and, further, may cause the AVMS to trigger or to initiate the performance of the self-diagnostic tests on one or more vehicles.

Figure 10A:
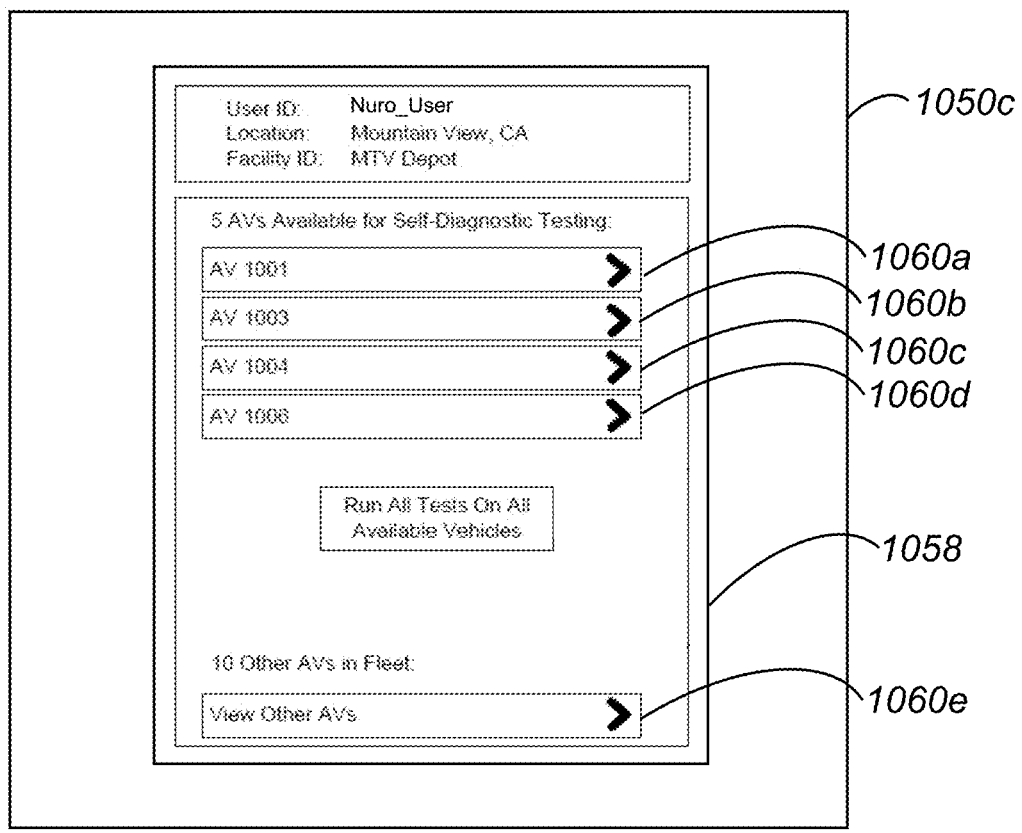
FIG. 10A is a diagrammatic representation of an interface associated with an AVMS that shows a first screen in accordance with an embodiment.

FIG. 10A is a diagrammatic representation of an interface associated with an AVMS that shows a first screen, e.g., a screen on a device that is associated with a particular fleet of vehicles, in accordance with an embodiment. A display or screen 1050c of a device such as a computing device or a smartphone displays a first or initial screen rendering 1058. First screen rendering 1058 is generally a graphical user interface that is presented to a user, e.g., a maintenance technician, when the user first accesses an AVMS to trigger diagnostics testing on one or more vehicles included in a vehicle fleet. First screen rendering 1058 may be presented to a user after the user is successfully authenticated, and may identify one or more vehicles that the user has permission to essentially test. Each vehicle may be associated with a selection 1060a-d that a user may activate to select one or more vehicles to be tested. A selection 1062e may enable a user to view other vehicles which may be selected for testing.

Figure 10B:
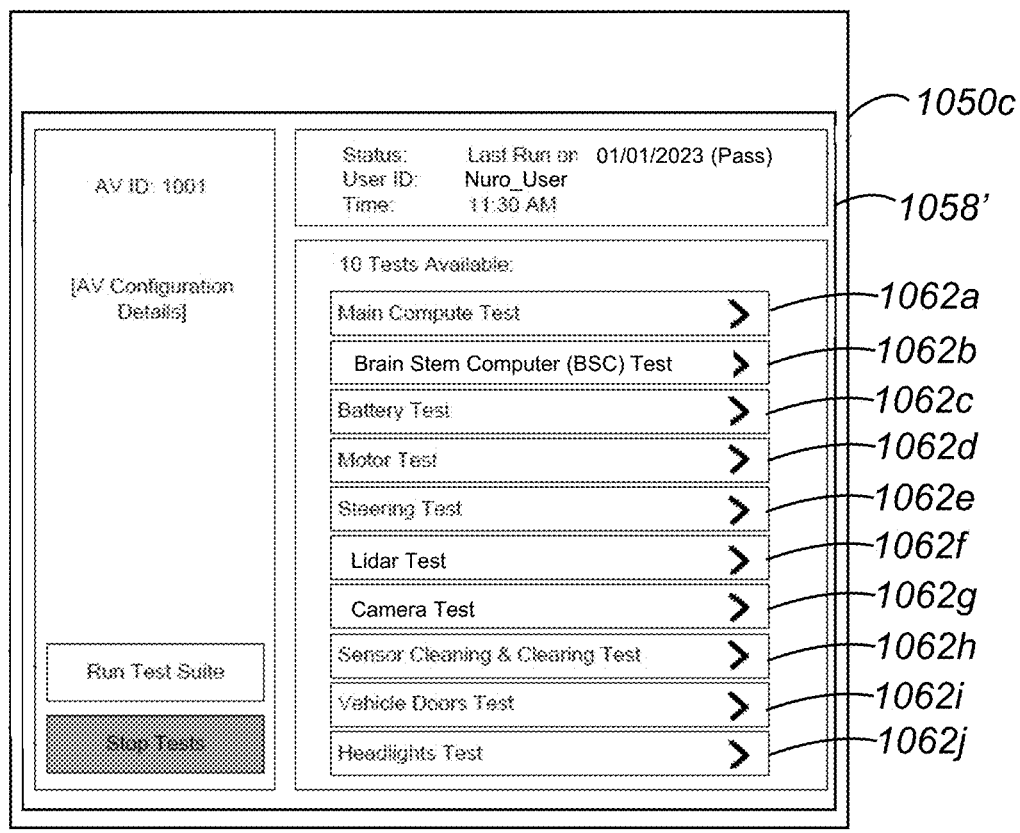
FIG. 10B is a diagrammatic representation of an interface associated with an AVMS, e.g., interface 1050c of FIG. 10A, that shows a second screen in accordance with an embodiment.

For each vehicle that is selected for testing, a user may be presented with a second screen rendering which enables the user to select one or more diagnostics test to command the vehicle to perform. FIG. 10B is a diagrammatic representation of interface 1050c which shows a screen that enables diagnostics tests to be selected for execution in accordance with an embodiment. After a user selects a particular vehicle on which diagnostics testing is to be performed, display or screen 1050c displays a second screen rendering 1058' which provides information relating to available diagnostics tests 1062a-j which the vehicle may perform. Second screen rendering 1058' is generally a graphical user interface that is presented to the user, and is interactive in that the user may select diagnostics tests 1062a-j using the graphical user interface.

In general, diagnostics tests 1062a-j are tests that may be available to the particular vehicle, or vehicles, associated with second screen rendering 1058'. Diagnostics tests 1062a-j that may be available include, but are not limited to including, a main compute test 1062a which tests one or more computing systems in a vehicle, a brain stem computer (BSC) test 1062b, a battery test 1062c, a motor test 1062d, a steering test 1062e, a lidar test 1062f, a camera test 1062g, a sensor cleaning and clearing test 1062h, a vehicle doors test 1062i, and a headlights test 1062j. Any number of tests 1062a-j may be selected for the vehicle to run or to otherwise execute. In one embodiment, a user may elect to command a vehicle to run substantially all available diagnostic tests 1062a-j.

Figure 10C:
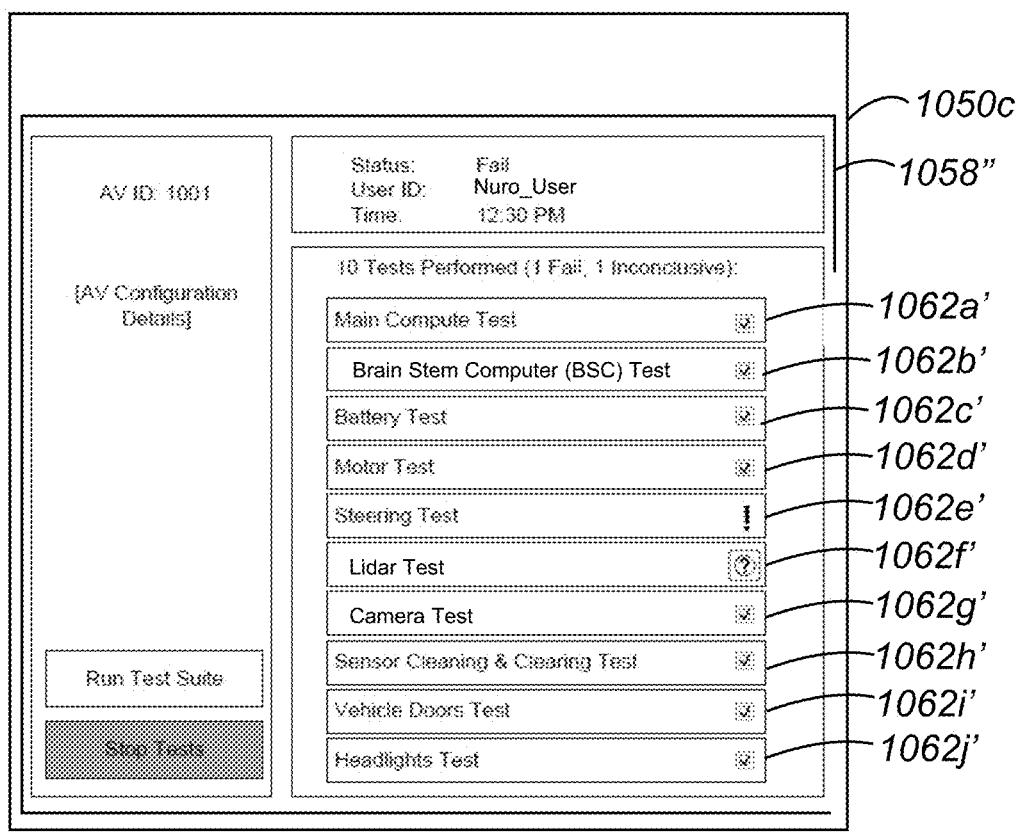
FIG. 10C is a diagrammatic representation of an interface associated with an AVMS, e.g., interface 1050c of FIGS. 10A and 10B, that shows a third screen in accordance with an embodiment.

When tests are completed with respect to a vehicle, the results of the tests may be indicated FIG. 10C is a diagrammatic representation of an interface associated with an AVMS, e.g., interface 1050c of FIGS. 10A and 10B, that shows a third screen in accordance with an embodiment. When diagnostics tests are completed, display or screen 1050c displays a third screen rendering 1058" which provides information relating to the results of diagnostics tests 1062a-j' which the vehicle has completed or otherwise attempted to complete. As shown, a test may either be considered passed as indicated by test 1062a', failed as indicated by test 1062f, and/or substantially requiring interpretation as indicated by test 1062*e*'. In one embodiment, a test may also be "non-conclusive" in that neither a pass nor a failure is indicated.

Figure 11:
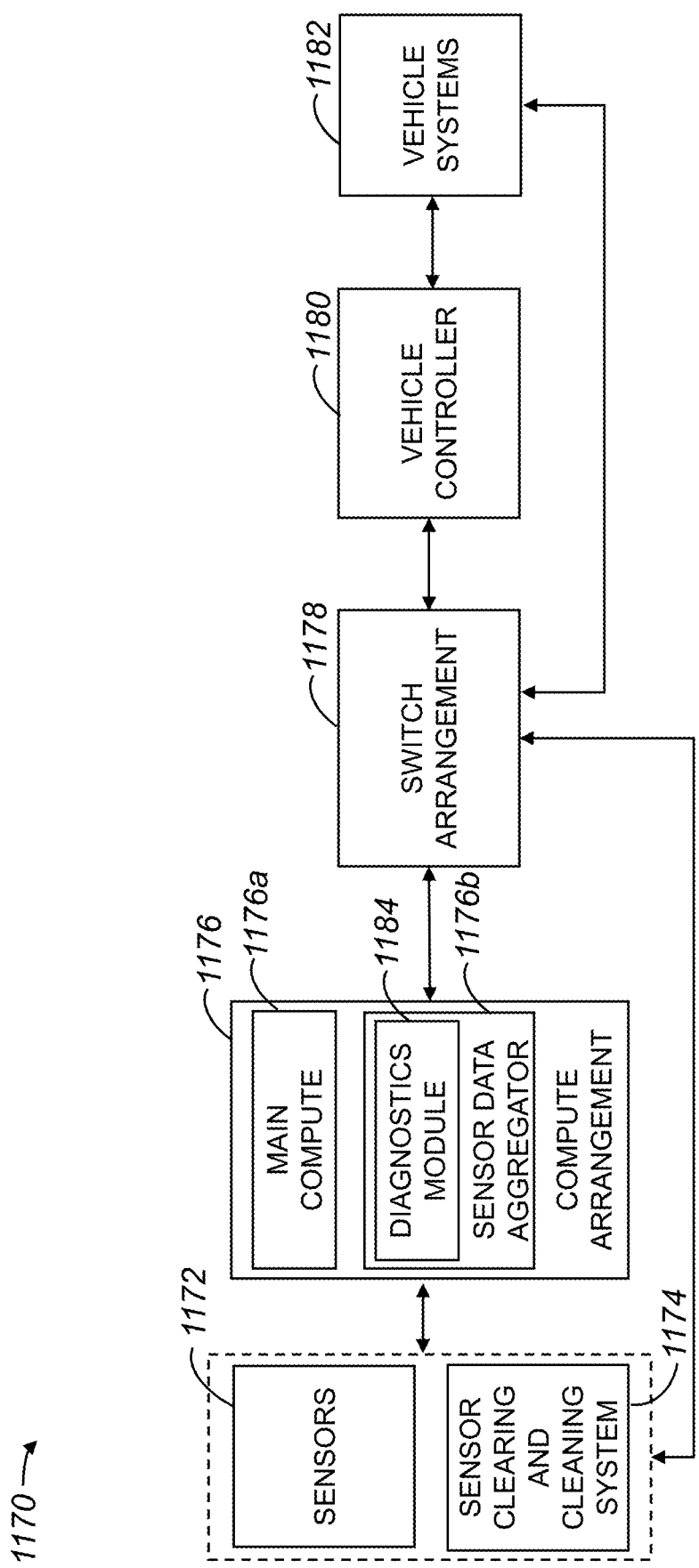
FIG. 11 is a block diagram representation of systems included in an autonomous vehicle that is configured to perform diagnostics tests, e.g., self-diagnostic tests, in accordance with an embodiment.

The various systems for which diagnostic tests may be performed with respect to an autonomous vehicle may vary widely. The systems may generally include components discussed above with respect to FIG. 3. The components discussed above with respect to FIG. 3 may be embodied, at least in part, in systems such as compute system or arrangement. With reference to FIG. 11, systems included in an autonomous vehicle that effectively enable the vehicle to perform diagnostics testing on itself will be discussed. FIG. 11 is a block diagram representation of systems included in an autonomous vehicle that is configured to perform diagnostics tests, e.g., self-diagnostic tests, in accordance with an embodiment. An overall arrangement 1170 which may be included in an autonomous vehicle includes one or more sensors 1172, a sensor clearing and cleaning system 1174, a compute arrangement 1176, a switch arrangement 1178, a vehicle controller 1180, and vehicle systems 1182.

Sensors 1172 may generally include sensors on a vehicle which provide collect data and provide the data to compute arrangement 1176 to facilitate the generation of autonomy commands and trajectories for the vehicle. For example, sensors 1172 may include, but are not limited to including, one or more lidars, one or more short range cameras, one or more long range cameras, one or more thermal cameras or thermal imaging sensors, one or more night vision cameras, one or more ultrasonic sensors, one or more microphones, and/or one or more radars.

Sensor clearing and cleaning system 1174 is configured to clean and to clear at least one surface associated with a sensor. In one embodiment, sensor clearing and cleaning system 1172 includes a fluid dispensing arrangement configured to pump or to otherwise dispense a fluid over a surface associated with the sensor, a valve configured to control the flow of the fluid, and a mechanism configured to clear the fluid off of the surface.

Compute arrangement 1176 may control sensor clearing and cleaning system 1174 and sensors 1172. Compute arrangement 1176 may include one or more computing arrangements or assemblies. For example, compute arrangement 1176 may include a primary or main computer system 1176*a* and a secondary compute system or a sensor data aggregator 1176*b*. Main compute system 1176*a* may be configured to generate autonomy commands and trajectories for a vehicle, and may enable the vehicle to operate autonomously or semi-autonomously. Autonomy commands and trajectories generated by main compute system 1176*a* or, more generally, compute arrangement 1176 may be provided to vehicle controller 1180. Sensor data aggregator 1176*b* is configured to collect and to effectively process data collected from sensors 1172, and includes a diagnostics module 1184 which facilitates the performance of diagnostics tests and analysis of information collected during diagnostics tests.

Compute arrangement 1176 may obtain a remote diagnostic command from an AVMS (not shown). Upon obtaining the remote diagnostic command, diagnostics module 1184 may initiate the performance of one or more diagnostics tests. For example, compute arrangement 1176 may generate a vehicle controller command that is provided to vehicle controller 1180 through switch arrangement 1178. The vehicle controller command may effectively cause vehicle controller 1180 to generate a controller area network command to vehicle systems 1182, provided over a controller area network, to effectively trigger one or more particular systems to initiate a self-diagnostic test. During a self-diagnostic test of a particular system, vehicle controller 1180 may obtain output data from over the controller area network from the particular system and provide the data to compute arrangement 1176 as diagnostic output. Compute arrangement 1176 may provide data over a network interface (not shown) to an AVMS.

Vehicle systems 1182 include, but are not limited to including, a steering system a drive train, a braking system, power systems such as a low voltage power system and a high voltage power system, a temperature regulation system, one or more HMI arrangements, a lighting system, a vehicle door management system, and/or a headlight system. It should be appreciated that the one or more HMI arrangements may be used to obtain a diagnostic mode user input provided by a user. In general, each system included in vehicle systems 1182 may be tested using a self-diagnostic test.

In one embodiment, in addition to performing sensor data processing and aggregation, sensor data aggregator 1176*b* may be arranged to implement teleoperations functionalities that enable a vehicle to be operated using teleoperator and may also serve as a backup to main compute system 1176*a*. By way of example, sensor data aggregator 1176*b* may provide parallel and/or failover autonomy systems which may enable a vehicle to operate in the event that there is an issue with main compute system 1176*a*.

Sensor data aggregator 1176*b* may aggregate and process sensor data obtained from sensors 1172. Some sensors 1172 may provide sensor data to compute arrangement 1176 through switch arrangement 1178. In addition, switch arrangement 1178 may facilitate providing data from compute arrangement 1176 to vehicle controller 1180. Sensor data aggregator 1176*b* may include one or more computing assemblies which may each include a network interface in addition to diagnostics module 1184. The network interface may enable communications with an AVMS and/or a teleoperations system.

Vehicle controller 1180, which may be a brain stem compute or controller, is configured to control components and systems of a vehicle to substantially cause the vehicle to operate based on the autonomy commands and trajectories. In addition, vehicle controller 1180 may control vehicle systems 1182.

Although only a few embodiments have been described in this disclosure, it should be understood that the disclosure may be embodied in many other specific forms without departing from the spirit or the scope of the present disclosure. By way of example, while autonomous vehicles which are managed by an AVMS have generally been described as occupantless delivery vehicles, an AVMS may also manage vehicles which carry occupants as well as non-autonomous vehicles. In other words, an AVMS may be used to command an autonomous vehicle which accommodates occupants to perform diagnostic testing, and may also be used to command non-autonomous vehicles.

While a user has been described as interacting with an AVMS using a user device to essentially order diagnostics tests for particular vehicles to perform on themselves, a user may instead interact directly with an AVSM or interact with the AVMS using an HMI on a vehicle. In other words, a user is not limited to accessing an AVMS user interface on a device such as a computing device or a smartphone. A user may interact directly with a computing device that hosts the AVMS or using an HMI of a vehicle that is in communication with the AVMS.

In one embodiment, a user interface provided to a user who has effectively ordered self-diagnostics tests for a vehicle may display a substantially real-time status of the testing. For instances, a user interface may provide an indication of which diagnostics test is currently being run and how much longer the diagnostics test may take to complete, which diagnostics tests have been completed, and/or which diagnostics tests are outstanding or are otherwise pending.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method comprising:
   identifying at least a first vehicle which is to be commanded to perform at least one diagnostics test;
   providing a remote diagnostics command to the first vehicle, the remote diagnostics command configured to cause the vehicle to generate a command to cause the first vehicle to perform at least a first diagnostics test, wherein the first diagnostics test is performed by the first vehicle on at least a first system included on the first vehicle, wherein the at least first system includes a clearing and cleaning system;
   monitoring the first vehicle during the first diagnostics test;
   obtaining diagnostics data from the first vehicle, the diagnostics data being associated with the first diagnostics test; and
   processing the diagnostics data to generate diagnostics.

2. The method of claim 1 further including:
   obtaining an input, wherein the input includes a request to access an interface, the interface configured to enable the first vehicle and the first diagnostics test to be specified, the method further including:
   performing a first authentication in response to the input, the first authentication arranged identify an access level; and
   providing the interface, the interface being configured based on the access level,
   wherein the first vehicle and the first diagnostics test are associated with the access level.

3. The method of claim 2 wherein providing the interface includes enabling the first vehicle to be selected for testing and enabling the first diagnostics test to be selected for performance.

4. The method of claim 1 wherein the diagnostics include one selected from a group including a pass indication and a fail indication.

5. The method of claim 1 wherein the first vehicle is an autonomous vehicle, and wherein the first vehicle is included in a fleet of vehicles, the method further including:
   maintaining information relating to the fleet of vehicles.

6. Logic encoded in one or more tangible non-transitory, computer-readable media for execution and when executed operable to:
   identify at least a first vehicle which is to be commanded to perform at least one diagnostics test;
   provide a remote diagnostics command to the first vehicle, the remote diagnostics command configured to cause the vehicle to generate a command to cause the first vehicle to perform at least a first diagnostics test, wherein the first diagnostics test is performed by the first vehicle on at least a first system included on the first vehicle, wherein the at least first system includes a clearing and cleaning system;
   monitor the first vehicle during the first diagnostics test;
   obtain diagnostics data from the first vehicle, the diagnostics data being associated with the first diagnostics test; and
   process the diagnostics data to generate diagnostics.

7. The logic of claim 6 wherein the logic is further operable to:
   obtain an input, wherein the input includes a request to access an interface, the interface configured to enable the first vehicle and the first diagnostics test to be specified, the logic further being operable to
   perform a first authentication in response to the input, the first authentication arranged identify an access level, and
   provide the interface, the interface being configured based on the access level, wherein the first vehicle and the first diagnostics test are associated with the access level.

8. The logic of claim 7 wherein the logic operable to provide the interface is further operable to enable the first vehicle to be selected for testing and to enable the first diagnostics test to be selected for performance.

9. The logic of claim 6 wherein the diagnostics include one selected from a group including a pass indication and a fail indication.

10. The logic of claim 6 wherein the first vehicle is an autonomous vehicle, and wherein the first vehicle is included in a fleet of vehicles, the logic further operable to:
maintain information relating to the fleet of vehicles.

11. The method of claim 1 wherein the vehicle includes a first sensor, and wherein the first diagnostics test performed by the first vehicle on the first system includes the first vehicle causing the clearing and cleaning system to clear and to clean the first sensor.

12. The logic of claim 6 wherein the vehicle includes a first sensor, and wherein the first diagnostics test performed by the first vehicle on the first system includes the first vehicle causing the clearing and cleaning system to clear and to clean the first sensor.

13. The logic of claim 12 wherein the logic operable to provide the remote diagnostics command to the first vehicle is operable to cause the first vehicle to generate at least one command to prepare the first sensor for the first diagnostics test and to activate the clearing and cleaning system.

14. A method comprising:
identifying at least a first vehicle which is to be commanded to perform at least one diagnostics test, the first vehicle including at least a first system and at least a first sensor,
wherein the at least first system is a clearing and cleaning system configured to clear and clean the at least first sensor;
causing the first vehicle to perform at least a first diagnostics test when the first vehicle is in a diagnostics mode, wherein the first diagnostics test is performed by the first vehicle on the at least first system, wherein causing the first vehicle to perform the first diagnostics test includes providing a command to the vehicle, wherein the command causes the vehicle to generate a command to perform the first diagnostics test on the at least first system;
monitoring the first vehicle while the first vehicle performs the first diagnostics test on the at least first system, wherein the first vehicle generates diagnostics data while the first vehicle performs the first diagnostics test on the at least first system;
obtaining diagnostics data from the first vehicle, the diagnostics data being associated with the first diagnostics test; and
processing the diagnostics data to generate diagnostics.

15. The method of claim 14 further including:
determining whether the first vehicle is in a diagnostics mode; and
causing the vehicle to initiate the diagnostics mode when the vehicle is not in the diagnostics mode.

16. The method of claim 14 wherein the diagnostics data is obtained from the at least first sensor, and wherein the diagnostics are associated with the at least first sensor.

17. The method of claim 14 further including:
presenting the diagnostics on an interface.

18. The method of claim 11 wherein providing the remote diagnostics command to the first vehicle causes the first vehicle to generate at least one command to prepare the first sensor for the first diagnostics test and to activate the clearing and cleaning system.

* * * * *